(12) United States Patent
Shimura

(10) Patent No.: US 7,880,595 B2
(45) Date of Patent: Feb. 1, 2011

(54) VEHICLE MONITORING SYSTEM

(75) Inventor: Kazuhiro Shimura, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 441 days.

(21) Appl. No.: 12/092,961

(22) PCT Filed: Oct. 26, 2006

(86) PCT No.: PCT/JP2006/321334

§ 371 (c)(1), (2), (4) Date: May 7, 2008

(87) PCT Pub. No.: WO2007/055103

PCT Pub. Date: May 18, 2007

(65) Prior Publication Data

US 2009/0160629 A1    Jun. 25, 2009

(30) Foreign Application Priority Data

Nov. 8, 2005  (JP)  ............................. 2005-323337

(51) Int. Cl.
G08B 21/00  (2006.01)
(52) U.S. Cl. ................. 340/431; 340/438; 340/440; 340/441; 340/447; 73/146.2; 73/146.3; 73/146.4; 73/146.5; 702/98; 702/138
(58) Field of Classification Search .......... 340/431, 340/438–447, 825.69, 870.28; 73/146, 146.2–146.5; 702/98, 127, 138; 377/2, 16, 25, 24.1
See application file for complete search history.

(56) References Cited

U.S. PATENT DOCUMENTS

| | | | |
|---|---|---|---|
| 5,109,213 A | 4/1992 | Williams | |
| 6,011,827 A * | 1/2000 | Kyrtsos | 377/24.1 |
| 6,246,317 B1 | 6/2001 | Pickornik et al. | |
| 7,260,497 B2 * | 8/2007 | Watabe | 702/140 |
| 2003/0020604 A1 * | 1/2003 | Fischer et al. | 340/442 |
| 2006/0276991 A1 * | 12/2006 | Watabe | 702/138 |

FOREIGN PATENT DOCUMENTS

| | | |
|---|---|---|
| JP | 06-255436 | 9/1994 |
| JP | 2002-516399 | 6/2002 |
| JP | 2002-216281 | 8/2002 |
| JP | 2003-509260 | 3/2003 |
| JP | 2003-528378 | 9/2003 |
| JP | 2003-291615 | 10/2003 |
| JP | 2006-021660 | 1/2006 |
| JP | 2006-335315 | 12/2006 |
| JP | 2006-335316 | 12/2006 |

* cited by examiner

*Primary Examiner*—George A Bugg
*Assistant Examiner*—Sisay Yacob
(74) *Attorney, Agent, or Firm*—Knobbe Martens Olson & Bear LLP

(57) ABSTRACT

A vehicle monitoring system which can readily identify information transmitted from each detecting device without requiring registration of identifying information of the detecting device is to be provided. Detecting devices transmit vehicle information including at least the result of detection and self-identifying information; a tractor relaying device and a trailer relaying device add their self-identifying information to vehicle data received on the basis of the identifying information of the detecting devices and transmit the vehicle data, and transmit registration data including their own relaying device IDs and types indicating the registration of the relaying device IDs; the tractor relaying device stores the relaying device ID of the registration data transmitted from the trailer relaying device on the basis of the type information and transmits that registration data, and transmits vehicle data received from the trailer relaying device on the basis of the relaying device ID. The display device receives the registration data and the vehicle data transmitted from the tractor relaying device, and stores the relaying device ID of the registration data on the basis of type information.

17 Claims, 14 Drawing Sheets

*Fig.* 8

Fig. 10
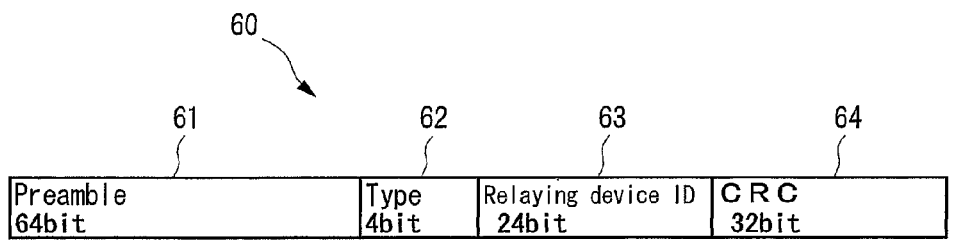
| Preamble 64bit | Type 4bit | Relaying device ID 24bit | CRC 32bit |
Fig. 11
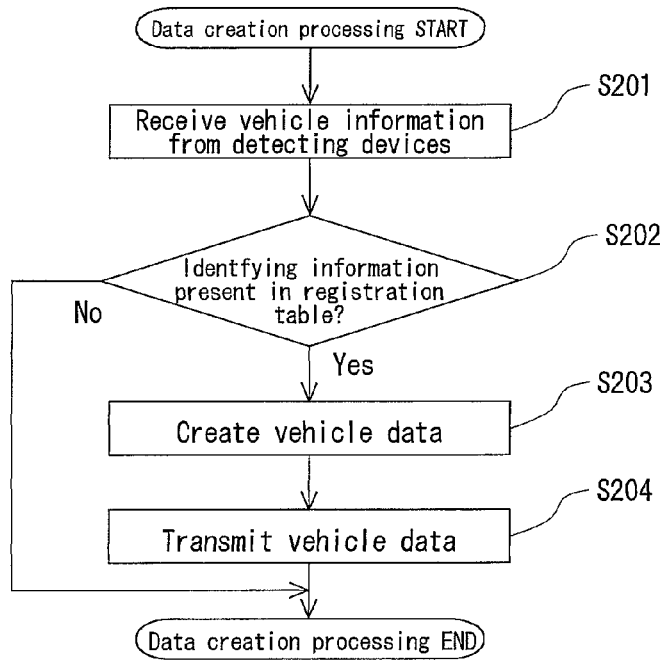
Fig. 12
| Position code | Detecting device ID | First air pressure | Second air pressure | First temperature | Second temperature |
|---|---|---|---|---|---|
| A 1 | XXi | 1010 | 510 | 51 | 101 |
| A 2 | XXj | 1020 | 520 | 52 | 102 |
| A 3 | XXK | 1030 | 530 | 53 | 103 |
| A 4 | XXL | 1040 | 540 | 54 | 104 |
| A 5 | XXM | 1050 | 550 | 55 | 105 |
| A 6 | XXN | 1060 | 560 | 56 | 106 |

Fig. 15

| ID code | Relaying device ID | Detected air pressure | Air pressure alarm | Detected temperature | Temperature alarm |
|---|---|---|---|---|---|
| A01 | XX1 | 1250 | 1 | 40 | 1 |
| A02 | XX1 | 1250 | 1 | 40 | 1 |
| A03 | XX1 | 1250 | 1 | 40 | 1 |
| A04 | XX1 | 1250 | 1 | 40 | 1 |
| A05 | XX1 | 1250 | 1 | 40 | 1 |
| A06 | XX1 | 1250 | 1 | 40 | 1 |
| A07 | XX2 | 1250 | 1 | 40 | 1 |
| A08 | XX2 | 1250 | 1 | 40 | 1 |
| A09 | XX2 | 1250 | 1 | 40 | 1 |
| A10 | XX2 | 1250 | 1 | 55 | 2 |
| A11 | XX2 | 1250 | 1 | 40 | 1 |
| A12 | XX2 | 1250 | 1 | 40 | 1 |
| A13 | XX2 | 511 | 3 | 40 | 1 |
| A14 | XX2 | 1250 | 1 | 40 | 1 |

VEHICLE MONITORING SYSTEM

CROSS REFERENCE TO RELATED APPLICATION

This application claims the benefit and priority to and is a U.S. National Phase of PCT International Application Number PCT/JP2006/321334, filed on Oct. 26, 2006, designating the United States of America, which claims priority under 35 U.S.C. §119 to Japanese Application Number 2005-323337 filed on Nov. 8, 2005. The disclosures of the above-described applications are hereby incorporated by reference in their entirety.

TECHNICAL FIELD

The present invention relates to a vehicle monitoring system for monitoring the state of a prescribed part of a vehicle, such as the air pressure and temperature of tires, and more particularly to a vehicle monitoring system that can be used for combination vehicles.

BACKGROUND ART

Inspection of the states of a vehicle including the air pressure of tires has long been an indispensable task for ensuring its safe running. However, since manual inspection of a vehicle costs much labor and time, vehicle monitoring systems were developed for automatic monitoring the states of vehicles including the air pressure of tires, and have begun to be used on combination vehicles (hereinafter the pulling vehicle in the combination will be referred to as the tractor and the pulled vehicle, as the trailer).

Already proposed such vehicle monitoring systems include one in which wireless signals are transmitted from sensor units (detecting devices) for detecting the pressure and temperature of each tire of the tractor and the trailer to the cab unit (one relaying device) either via a trailer transponder (another relaying device) or directly and the information received by the cab unit (the one relaying device) having received the information on pressures and temperatures is displayed on a display (display device) to provide an alarm or the like to the driver (see Patent Document 1 for instance), and another in which each tire is equipped with a tag (detecting device) combining a responder, a pressure sensor and so forth, an RF (radio frequency) signal measured and transmitted by each tag (detecting device) is received by a monitor (another relaying device) disposed in the vicinity of each tire, each monitor is connected via a data bus to a computer (one relaying device) provided in the vehicle, and the computer (the one relaying device) deciphers the RF signals transmitted from the tag (detecting device) of each tire and outputs the information to a central display (display device) (see Patent Document 2 for instance).

However, in the vehicle monitoring system according to Patent Document 1 or Patent Document 2, since information transmitted by the detecting devices are recognized on the basis of identifying information of detecting devices registered with the one relaying device and displayed on the display device, when the trailer linked to the tractor is to be changed, there is a fear that, unless identifying information of the plurality of detecting devices disposed on the new trailer is registered with the one relaying device anew, it may be impossible to recognize information transmitted by each detecting devices on the trailer and display it on the display device disposed on the trailer.

As a solution to this problem, it is proposed to set, when the trailer linked to the tractor is to be changed, environmental data for the replacing trailer by connecting an electronic key storing environmental data including identifying information of each module (detecting device) of the trailer to a central unit (one relaying device) of the tractor (see Patent Document 3 for instance).

Patent Document 1: National Publication of International Patent Application No. 2002-516399
Patent Document 2: National Publication of International Patent Application No. 2003-509260
Patent Document 3: Japanese Patent Publication No. H6-255436

DISCLOSURE OF THE INVENTION

Problems to be Solved by the Invention

However, whereas the vehicle monitoring system according to Patent Document 3 receives electric waves from all the modules (detecting devices) with an antenna provided on the central unit (one relaying device) of the tractor, in Japan the Radio Law limits the high frequency outputs of the module (detecting device) to a field intensity of not more than 500 μV/m in a 3 m distance from the module (detecting device), and it is extremely difficult for the antenna provided on the central unit (one relaying device) of the tractor to receive the electric wave transmitted from the module (detecting device) of the trailer in transmission and reception over such a long distance as that between tractor and the trailer.

An object of the present invention is to provide, in view of the problems noted above, a vehicle monitoring system which can readily identify information transmitted from each detecting device without requiring registration of identifying information of the detecting device.

Means for Solving the Problems

In order to achieve the object stated above, the present invention proposes a vehicle monitoring system provided with a plurality of detecting devices each of which detects a state of a prescribed position of a vehicle and transmits the result of detection; a plurality of relaying devices each of which receives the result of detection transmitted from the plurality of detecting devices and transmits the result of detection; and a display device which displays the results of detection transmitted by the plurality of relaying devices, wherein a prescribed detecting device has means of transmitting vehicle information including at least the result of detection and self-identifying information; each of the relaying devices has vehicle information determining means which decides, on the basis of identifying information of at least one detecting device stored in advance, whether or not to receive vehicle information transmitted by the detecting device, vehicle information transmitting means which transmits, when the vehicle information determining means has decided to receive vehicle information, that vehicle information with the self-identifying information included therein, and registration information transmitting means which transmits registration information including self-identifying information and type information indicating the registration of that self-identifying information; one relaying device out of the plurality of relaying devices transmits vehicle information and registration information to the display device, and the other relaying device transmits vehicle information and registration information to the one relaying device; the one relaying device has registration information determining means which decides, on the basis of type information stored in advance, whether or not to receive registration information transmitted by the other relaying device, registration information transfer means which, when the registration information determining means has decided to receive the registration information, stores identifying information contained in the registration information and transmits the registration information to the display device, vehicle information determining means which, on the basis of the identifying information of the stored registration information, decides whether or not to receive vehicle information transmitted by the other relaying device, and vehicle information transfer means which, when the vehicle information determining means has decided to receive the vehicle information, transmits the received vehicle information to the display device; and the display device has receiving means which receives vehicle information and registration information transmitted by the one relaying device, and storage means which, on the basis of type information stored in advance, stores identifying information contained in the registration information.

According to the invention, since each relaying device receives, vehicle information transmitted from detecting devices in which identifying information is stored in advance and transmits vehicle information with the self-identifying information included therein, one relaying device stores identifying information of the other relaying device, and transmits to the display device vehicle information and registration information transmitted by the other relaying device, together with vehicle information the one relaying device receives and creates and its own registration information, and the display device stores identifying information of the one relaying device and the other relaying device, the display device is enabled to identify according to the identifying information of a relaying device contained in vehicle information the relaying device having transmitted that vehicle information.

ADVANTAGES OF THE INVENTION

According to the invention, since the display device can identify, according to the identifying information contained in vehicle information, the relaying device having transmitted that vehicle information, it is possible to readily identify, when for instance the trailer linked to the tractor has been changed, the detecting device without requiring registration with the display device of the identifying information of each detecting device the new trailer is equipped with from the identifying information of the relaying device and the detecting device contained in the vehicle information transmitted by each relaying device.

The above-stated object and any other object, features and advantages of the present invention will become more apparent from the following description and the accompanying drawings.

BRIEF DESCRIPTION OF THE DRAWINGS

FIG. 10 is a data configuration diagram of registration data created by the trailer relaying device and the tractor relaying device;

FIG. 11 is a flow chart of data creation processing shown in FIG. 8;

FIG. 12 illustrates a registration table stored in the trailer relaying device and the tractor relaying device;

FIG. 15 illustrates a storage table stored in the display device;

DESCRIPTION OF SYMBOLS

1 . . . Combination vehicle, 2 . . . tractor, 3 . . . trailer, 4 . . . tire, 10, 10A . . . detecting device, 11, 11A . . . central processor, 111 . . . CPU, 113 . . . storage unit, 12, 12A . . . sensor unit, 121, 121A . . . first sensor, 122, 122A . . . second sensor, 14 . . . antenna, 20 . . . trailer relaying device, 21, 31 . . . detecting device antenna, 22, 32 . . . relaying device body, 23, 33 . . . relaying device antenna, 25, 35 . . . central processor, 251, 351 . . . CPU, 253, 352 . . . storage unit, 30 . . . tractor relaying device, 40 . . . display device, 41 . . . central processor, 411 . . . CPU, 412 . . . storage unit, 42 . . . display unit, 43 . . . display panel, 431 . . . fitting position display, 432 . . . relaying device display, 433 . . . LED, 435 . . . fitting position display change-over button, 436 . . . relaying device display change-over button, 50 . . . linking line, 51, 52 . . . communication line, 60 . . . registration data, 62 . . . type, 63 . . . relaying device ID, 70, 70A . . . registration table, 71 . . . position code, 71A . . . communication code, 72 . . . detecting device ID, 72A . . . communication line ID, 73 . . . first air pressure, 74 . . . second air pressure, 75 . . . first temperature, 76 . . . second temperature, 80, 80A . . . vehicle data, 84a . . . ID code, 84b . . . detected air pressure, 84c . . . air pressure alarm, 84d . . . detected temperature, 84e . . . temperature alarm, 91 . . . ID code, 92 . . . relaying device ID, 93 . . . detected air pressure, 95 . . . detected temperature.

BEST MODE FOR CARRYING OUT THE INVENTION

Figure 1:
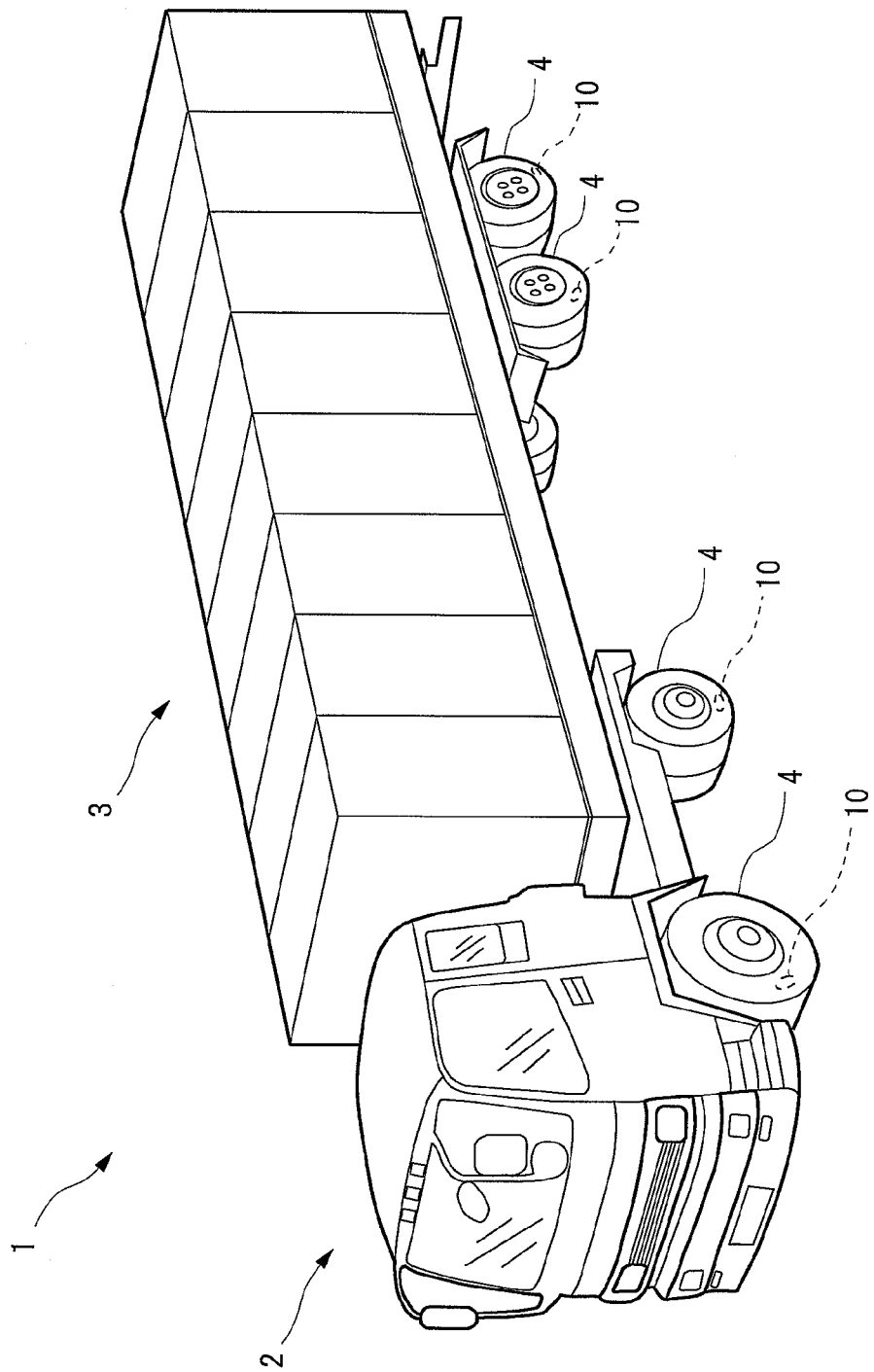
FIG. 1 shows an external perspective view of a combination vehicle mounted with a vehicle monitoring system in a first embodiment of the present invention.
Figure 2:
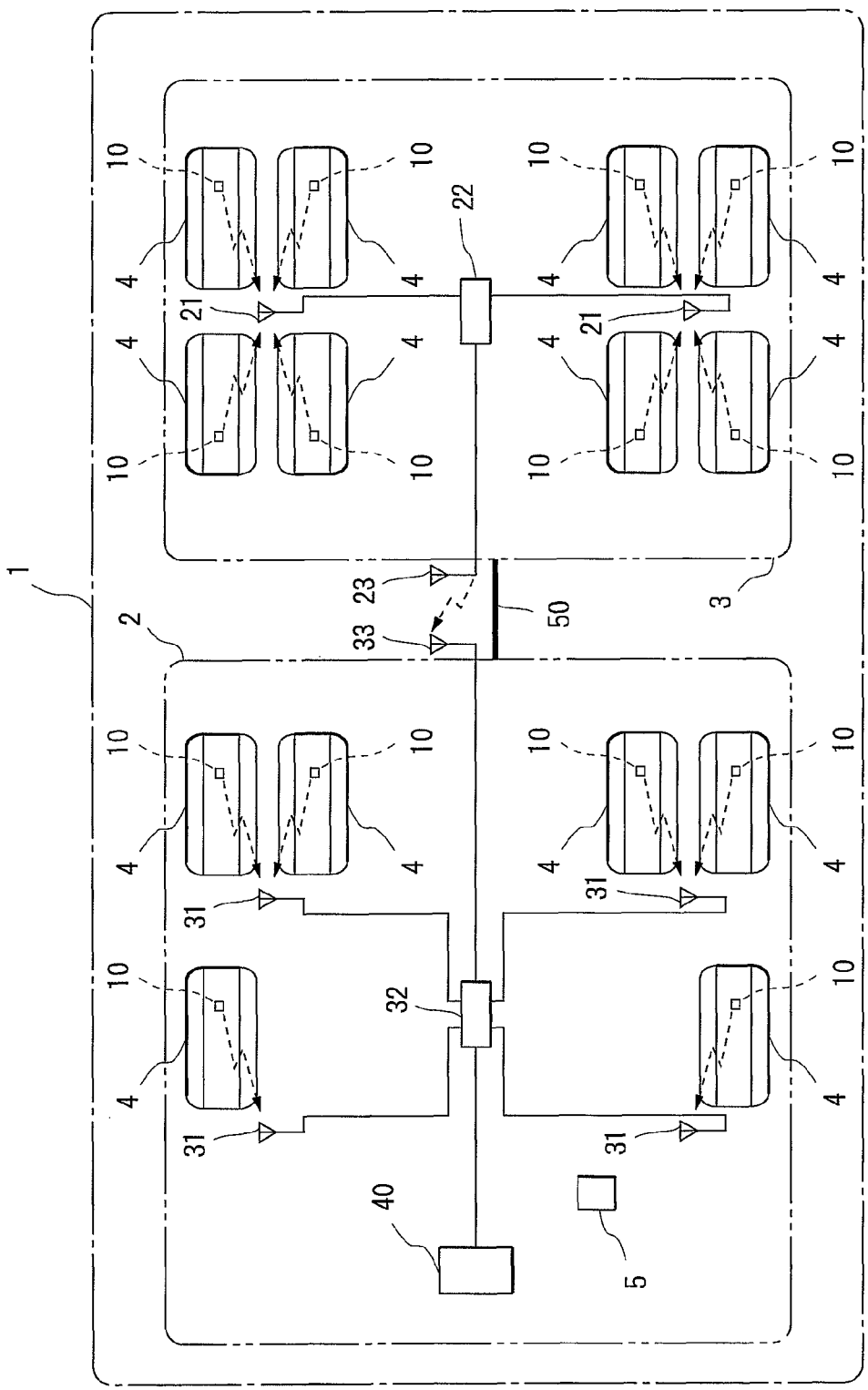
FIG. 2 shows a horizontal plane of the vehicle monitoring system shown in FIG. 1.
Figure 3:
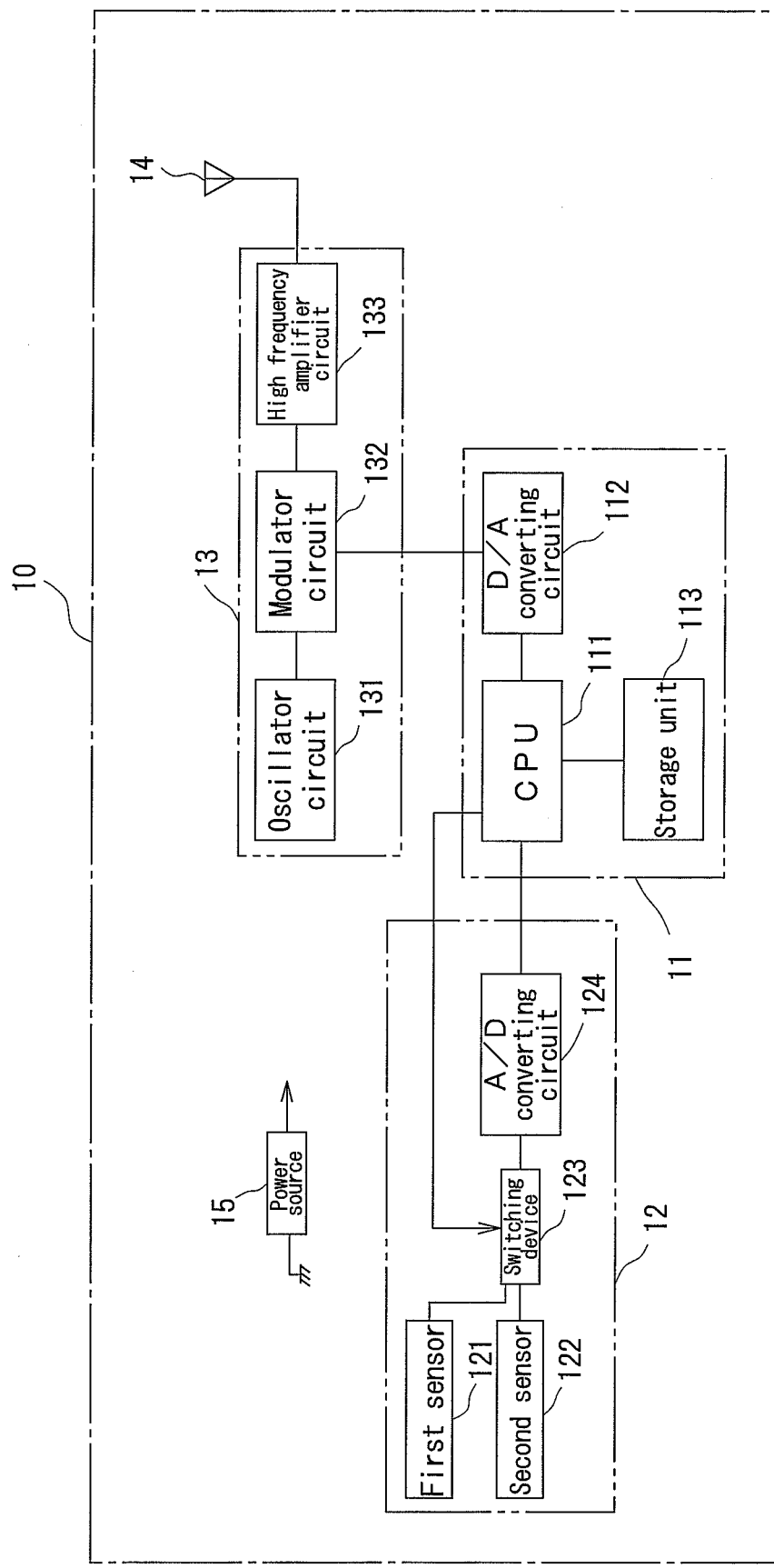
FIG. 3 is a block diagram showing the electric circuit of a detecting device.
Figure 4:
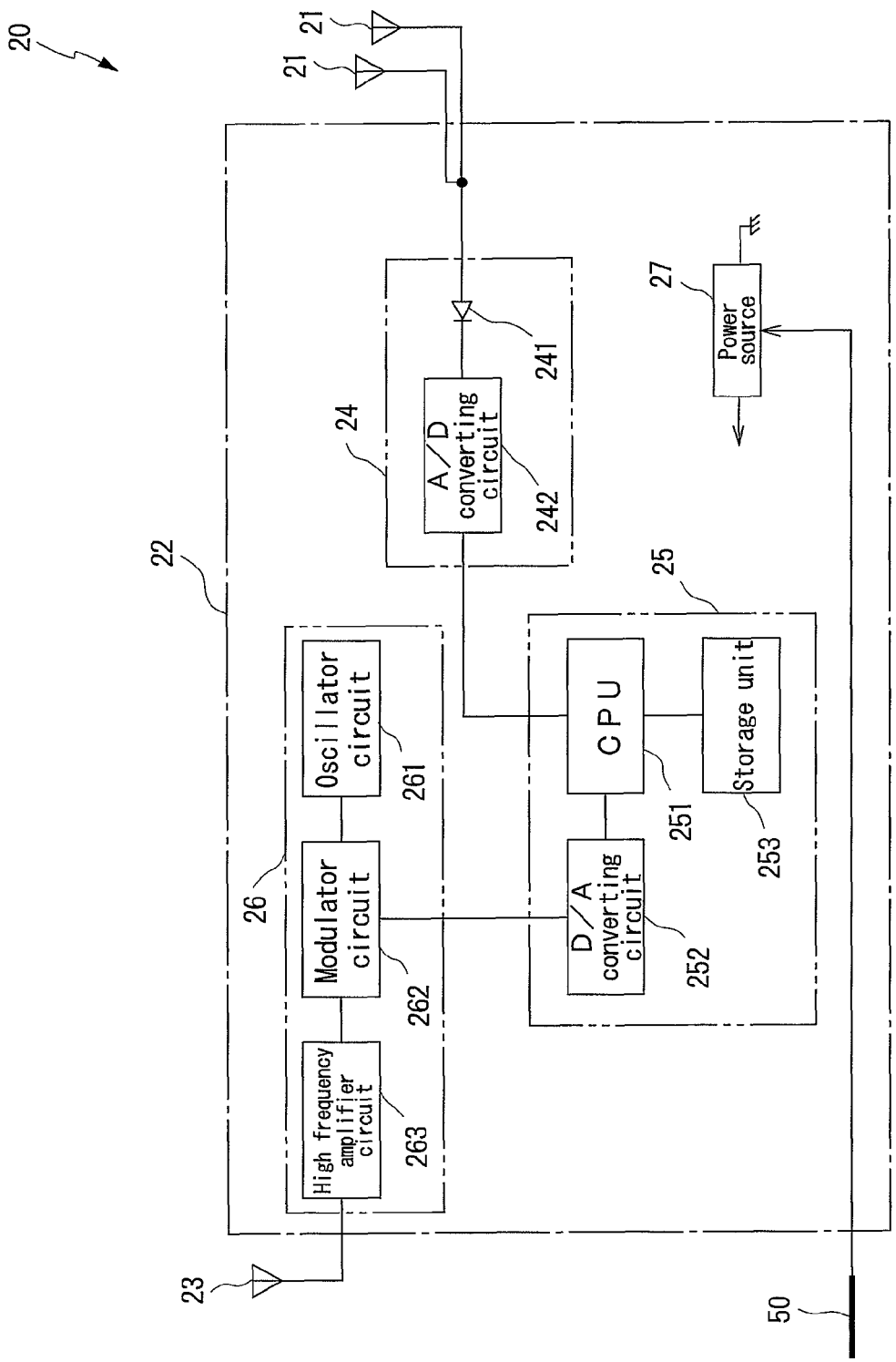
FIG. 4 is a block diagram showing the electric circuit of a trailer relaying device.
Figure 5:
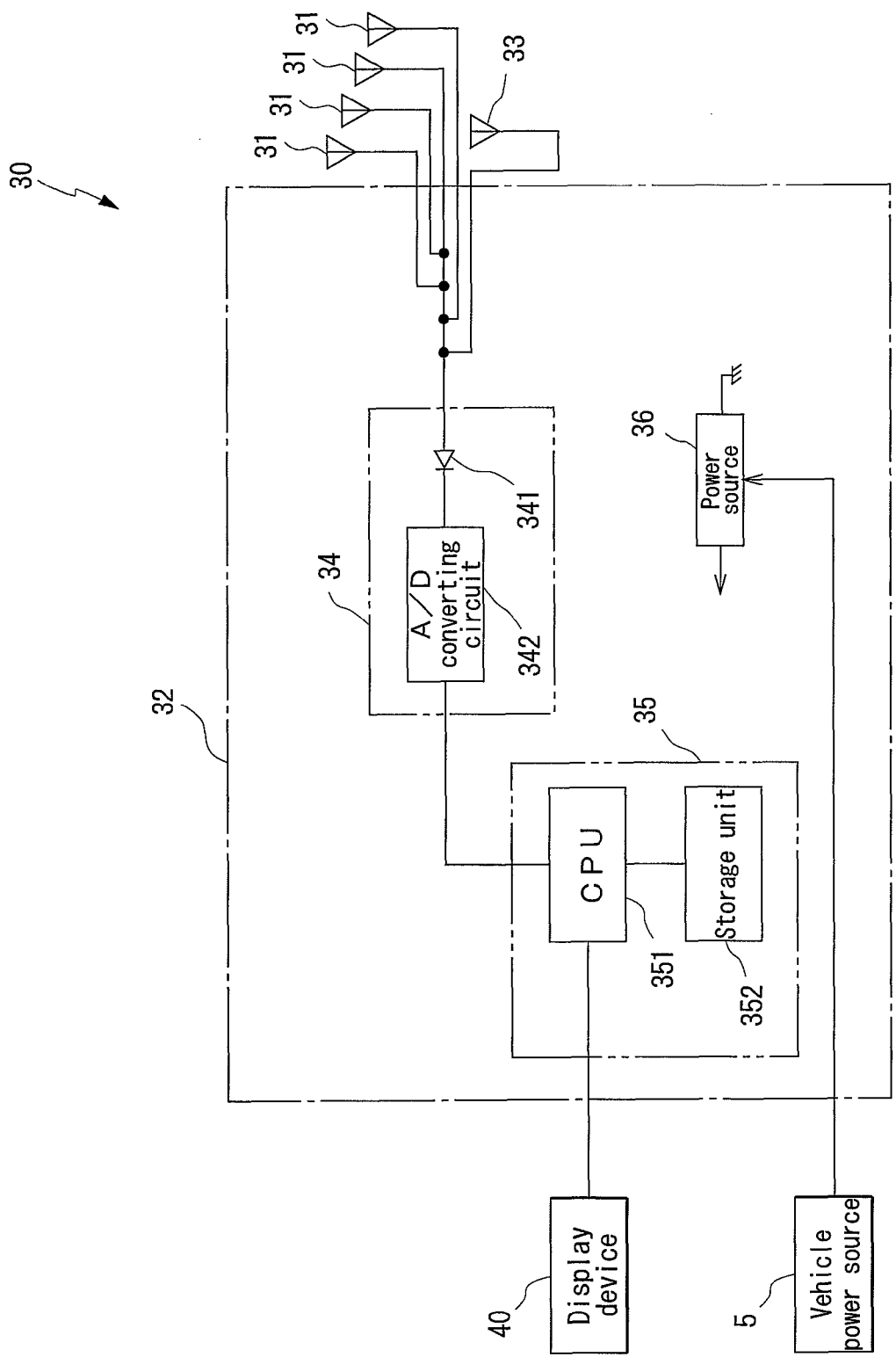
FIG. 5 is a block diagram showing the electric circuit of a tractor relaying device.
Figure 6:
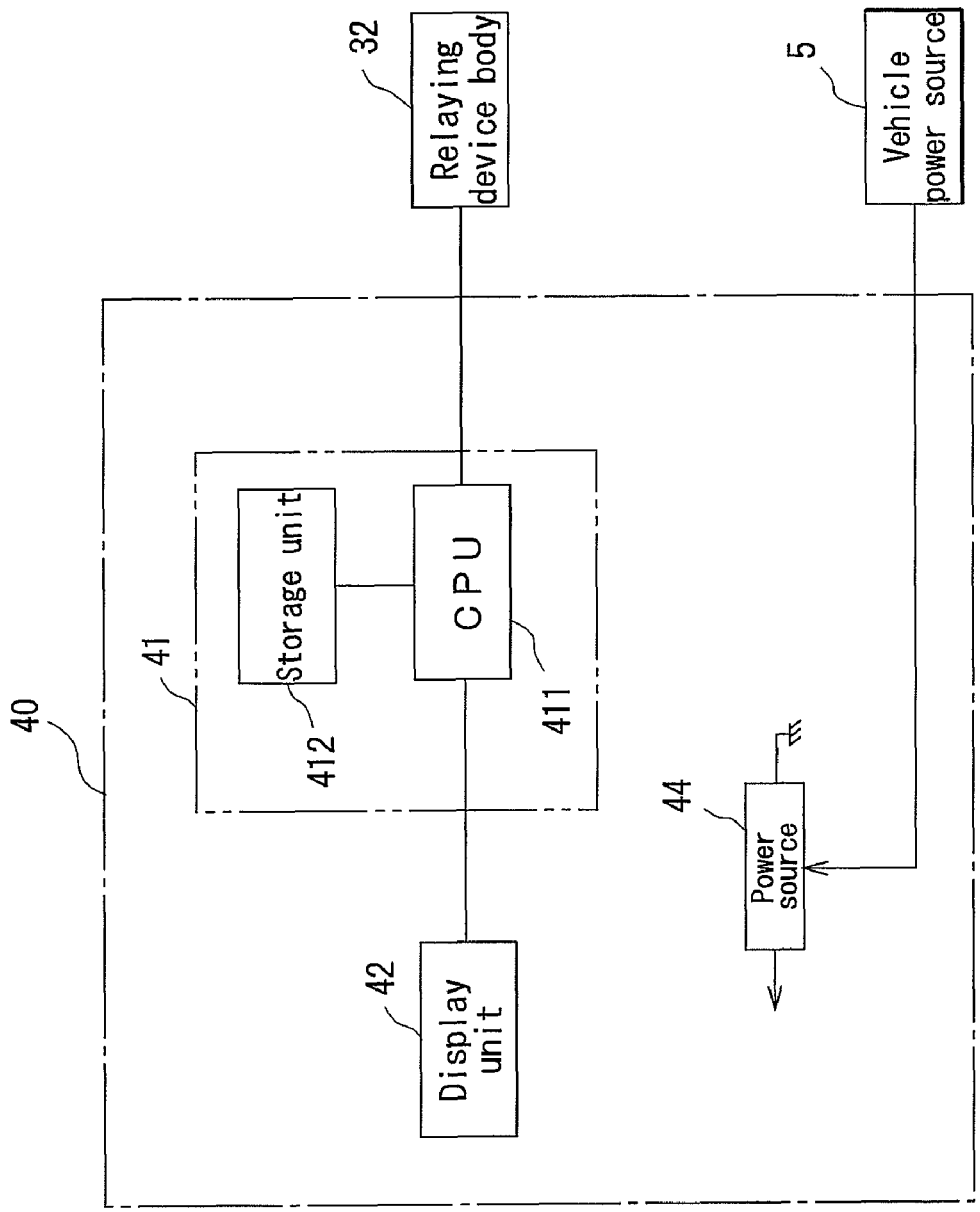
FIG. 6 is a block diagram showing the electric circuit of a display device.
Figure 7:
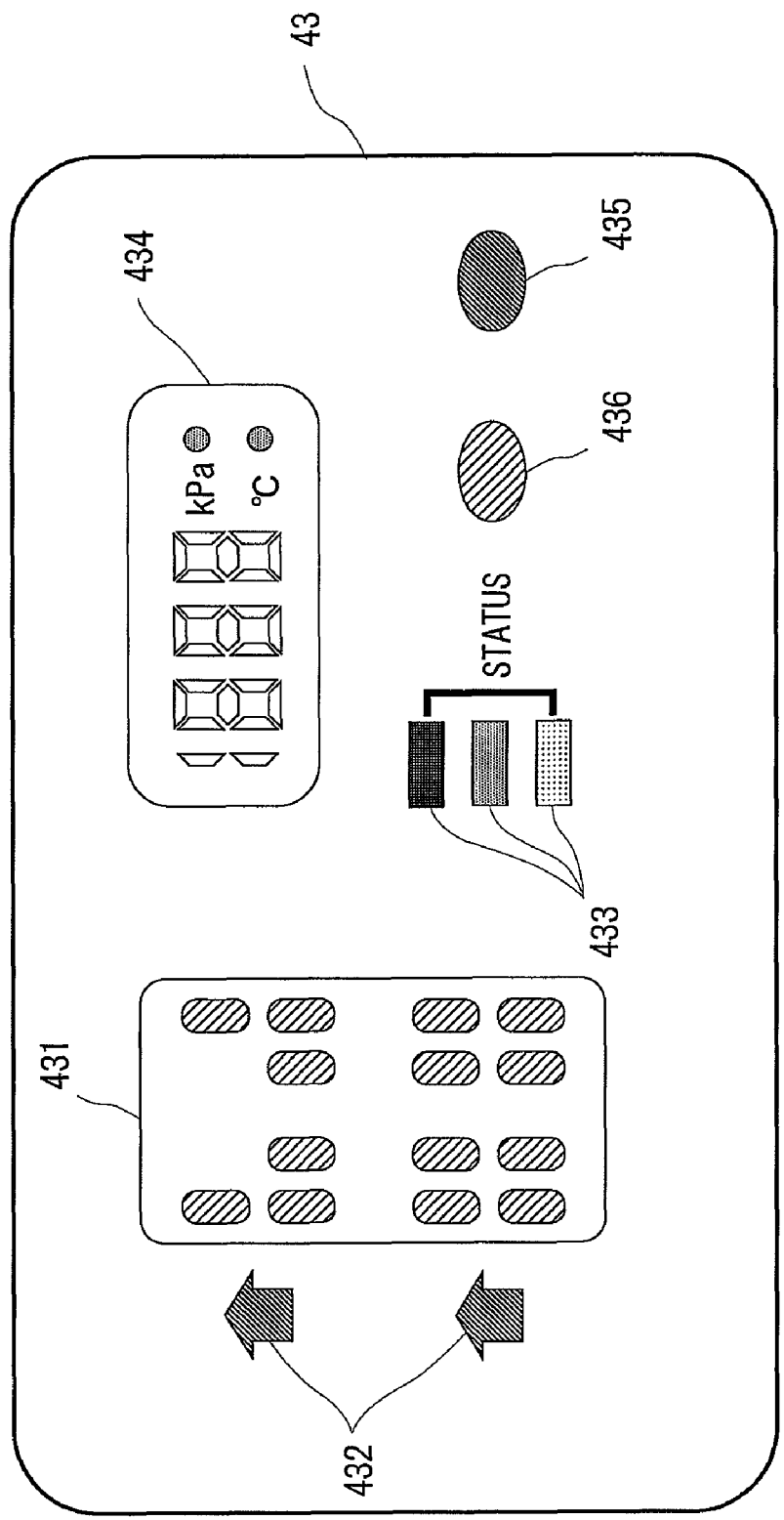
FIG. 7 is a configurational diagram showing the display panel of the display device.
Figure 8:
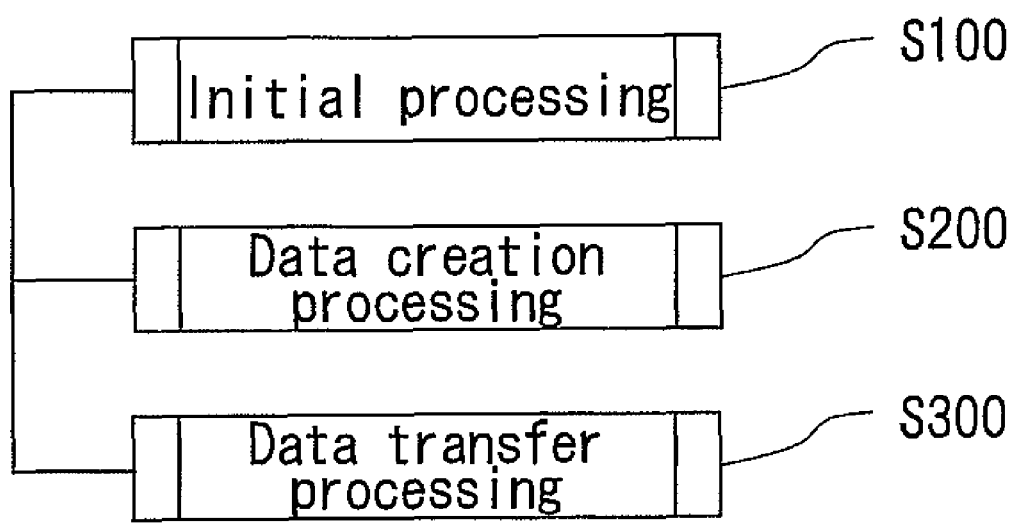
FIG. 8 is a diagram of processing configuration of the vehicle monitoring system.
Figure 9:
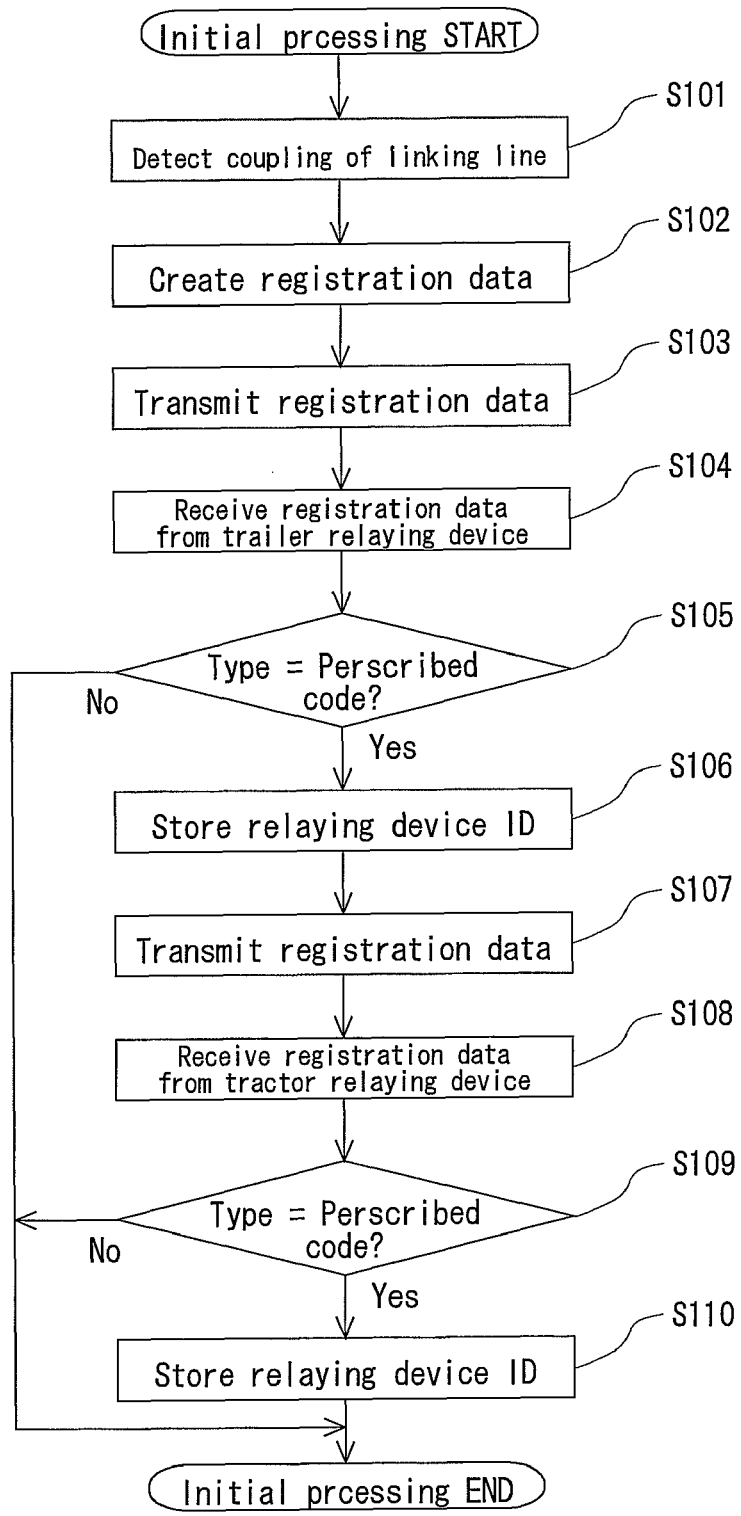
FIG. 9 is a flow chart of initial processing shown in FIG. 8.
Figure 13:
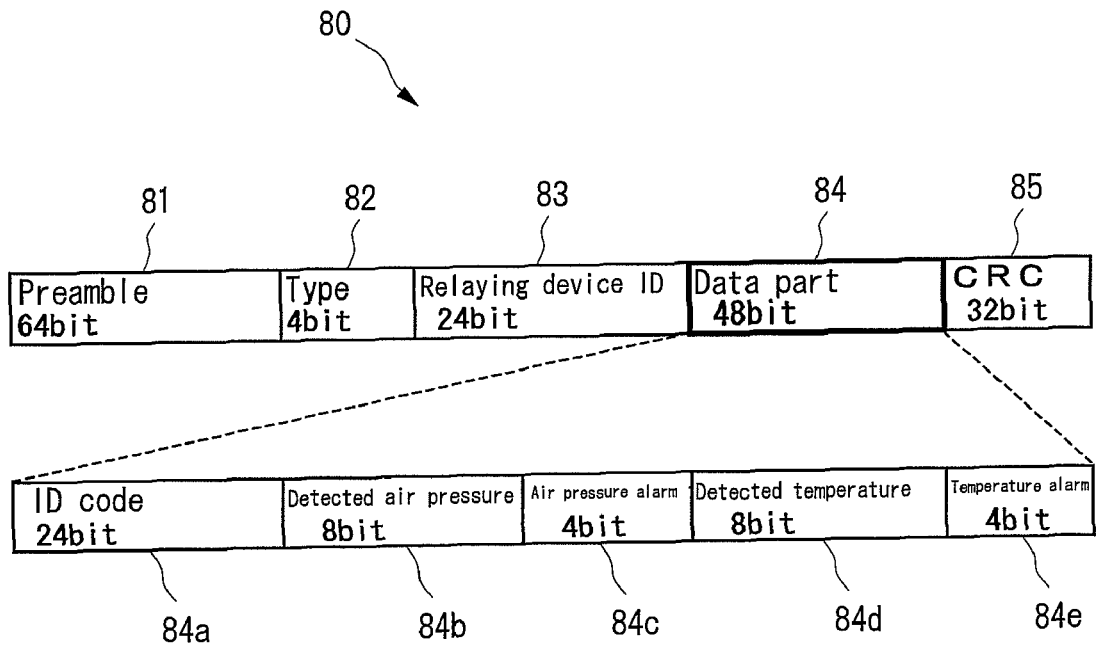
FIG. 13 is a data configuration diagram of vehicle data transmitted from the trailer relaying device and the tractor relaying device.
Figure 14:
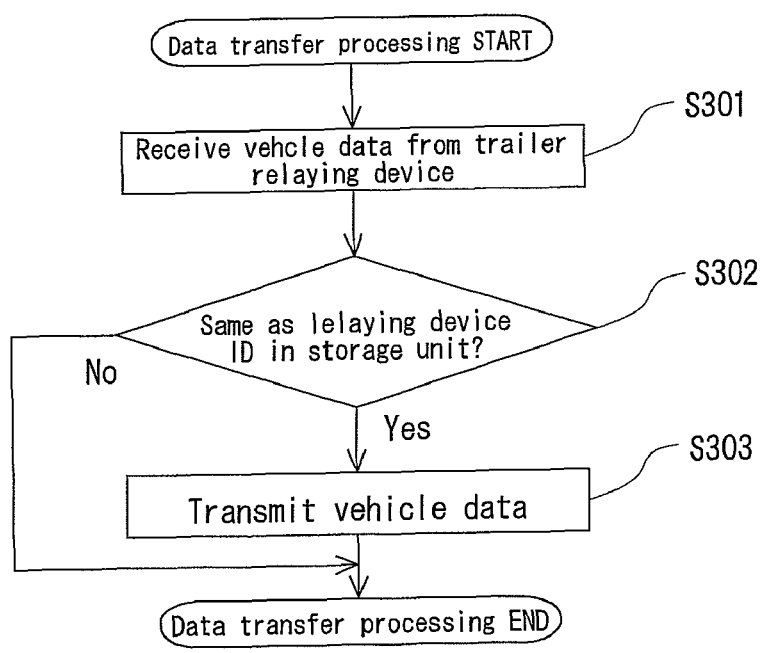
FIG. 14 is a flow chart of data transfer processing shown in FIG. 8.

Out of FIG. 1 through FIG. 15 which show a first embodiment of the present invention, FIG. 1 is an external perspective view of a combination vehicle mounted with a vehicle monitoring system in the first embodiment of the present invention; FIG. 2 is a horizontal plane of the vehicle monitoring system shown in FIG. 1; FIG. 3 is a block diagram showing the electric circuit of a detecting device; FIG. 4 is a block diagram showing the electric circuit of a trailer relaying device; FIG. 5 is a block diagram showing the electric circuit of a tractor relaying device; FIG. 6 is a block diagram showing the electric circuit of a display device; FIG. 7 is a configurational diagram showing the display panel of the display device; FIG. 8 is a diagram of processing configuration of the vehicle monitoring system; FIG. 9 is a flow chart of initial processing shown in FIG. 8; FIG. 10 is a data configuration diagram of registration data created by the trailer relaying device and the tractor relaying device; FIG. 11 is a flow chart of data creation processing shown in FIG. 8; FIG. 12 illustrates a registration table stored in the trailer relaying device and the tractor relaying device; FIG. 13 is a data configuration diagram of vehicle data transmitted from the trailer relaying device and the tractor relaying device; FIG. 14 is a flow chart of data transfer processing shown in FIG. 8; and FIG. 15 illustrates a storage table stored in the display device.

First, the overall configuration of the vehicle monitoring system in the first embodiment of the present invention will be described with reference to FIG. 1 and FIG. 2. In the following description, the front in the running direction of a combination vehicle 1 in FIG. 1 will be referred to as the front, the rear as the rear, the right side as the right and the left side as the left.

The combination vehicle 1 is a vehicle formed of a tractor 2 and a trailer 3 for instance. The combination vehicle 1 is not limited to a vehicle consisting of a tractor and a trailing truck in the legal language, but may be any combination of two linked unit vehicles such as a trailer bus, tank lorry, camping car, wrecker and towed vehicle, or farming vehicle. Also, the number of unit vehicles constituting the combination may more than two.

Every one of tires 4 the tractor 2 and the trailer 3 are equipped with has a detecting device 10 embedded in the tire 4 or stuck to the surface of the tire 4, which detects the state of the tire 4 and transmits the result of detection by electromagnetic wave. This enables the state of every tire 4 the combination vehicle 1 is equipped with to be detected.

Incidentally, the way of installing the detecting devices 10 is not limited to direct fitting to the tires 4, but may as well be fitting to the wheel side, such as the rims or the wheels as such.

Or it is also possible to fit the devices to other positions in the combination vehicle 1 to detect the state of the combination vehicle 1 except the tires 4, such as fitting of vehicle-mounted air tanks to detect the air pressure condition.

In the vicinity of each detecting device 10 on the trailer 3, such as each tire house or fender, at least one detecting device antenna 21 for receiving electromagnetic waves transmitted from at least one detecting device 10 is disposed. It is thereby made possible for the result of detection by each detecting device 10 to be transmitted and received by weak electromagnetic waves conforming to the Japanese Radio Law.

A relaying device body 22, which is the body of a trailer relaying device 20, is disposed in a prescribed position in the trailer 3, decides whether or not to receive the result of detection transmitted from the detecting device 10, and inputs to a relaying device antenna 23 signals including this result of detection. Incidentally, though the trailer 3 is provided with only one trailer relaying device 20 in this embodiment of the invention, its number is not limited to this, but two or more may be disposed.

In the vicinity of each detecting device 10 on the tractor 2, such as each tire house or fender, at least one detecting device antenna 31 for receiving electromagnetic waves transmitted from at least one detecting device 10 is disposed.

A relaying device body 32, which is the body of a tractor relaying device 30, is disposed in a prescribed position in the tractor 2, decides whether or not to receive the result of detection transmitted from a detecting device 10, and inputs to a relaying device antenna 33 signals including this result of detection.

At the front end of the trailer 3, there is disposed the relaying device antenna 23 for transmitting signals outputted from the relaying device body 22, while at the rear end of the tractor 2, there is disposed the relaying device antenna 33 for receiving electromagnetic wave transmitted from this relaying device antenna 23, and the relaying device antennas 23 and 33 are positioned sufficiently close to each other for transmission and reception to be possible between them. Wiring is thereby made easier than when performing transmission and reception by wired means, such as cables, and the result of detection by each detecting device 10 disposed on the trailer 3 is enabled to be transmitted and received by weak electromagnetic waves conforming to the Japanese Radio Law.

A display device 40, disposed in the vicinity of the driver's seat of the tractor 2, receives and displays signals transmitted from the relaying device body 32. By disposing at least one trailer relaying device 20 in the trailer 3 and the tractor relaying device 30 and the display device 40 in the tractor 2 in this way, it is made possible for the state of the tires 4 of the trailer 3 to be displayed on the display device 40 disposed in the tractor 2.

Incidentally, though the display device 40 is disposed in the tractor 2 in this embodiment, it is not limited to this, it may as well be installed elsewhere than in the tractor 2, for instance in a service station, a toll gate or another monitoring vehicle, as long as signals can be received from the tractor relaying device 30 whether by wire or wirelessly.

A vehicle power source 5, which is a known battery or the like provided on the tractor 2, supplies power necessary for the operation of the tractor relaying device 30 and the display device 40. A linking line 50, which is to electrically link the tractor 2 and the trailer 3, is coupled by the linking of a linking coupler, the connection of an ABS connector and otherwise, and supplies power necessary for operation from the vehicle power source 5 disposed on the tractor 2 to the relaying device body 22 provided on the trailer 3.

Next, the configuration of the detecting device shown in FIG. 2 will be described with reference to FIG. 3.

In the drawing, the detecting device 10 is configured of a central processor 11, a sensor unit 12, a transmitting unit 13, an antenna 14 and a power source 15.

The central processor 11 is configured of a known CPU 111, a digital-to-analog (hereinafter referred to as D/A) converting circuit 112 and a storage unit 113.

The CPU 111, operating in accordance with a program stored in a semiconductor memory of the storage unit 113, outputs the result of detection by the sensor unit 12 to the transmitting unit 13 via the D/A converting circuit 112.

The storage unit 113 comprises a ROM in which the programs for operating the CPU 111 are stored, a nonvolatile semiconductor memory, such as an EEPROM (electrically erasable and programmable read-only memory) and a volatile semiconductor memory for temporarily storing data or programs, such as an SRAM (static random-access memory), and identifying information unique to each individual detecting device 10 is stored into an area, designated to permit no rewriting, of the storage unit 113 in advance at the time of manufacture.

The sensor unit 12 is configured of first and second sensors 121 and 122, a switching device 123 and an A/D converting circuit 124. As the first and second sensors 121 and 122, sensors which detect the physical quantities of the tire 4, convert them into electrical signals and output them are used, such air pressure sensors, temperature sensors, humidity sensors, distance sensors and acceleration sensors. Incidentally, for detection of the state of the combination vehicle 1 in any other respect than the tires 4, sensors for detecting other information than physical quantities may be used. For instance, cameras or back sonars for checking the state behind the combination vehicle 1 may be used.

In this embodiment, an air pressure sensor which detects the air pressure within the tire 4 and outputs a voltage corresponding to the air pressure is configured as the first sensor 121, and a temperature which detects the temperature within the tire 4 and outputs a voltage corresponding to the temperature is configured as the second sensor 122. This arrangement enables the physical quantities of the combination vehicle 1 to be detected. Incidentally, the number of sensors is not limited to two, but can be increased or reduced as required.

The switching device 123, configured of an electronic switch for instance, switches over the connection between the first sensor 121 and the A/D converting circuit 124 and that between the second sensor 122 and the A/D converting circuit 124 under the control of the central processor 11.

The A/D converting circuit 124 converts the output voltage of the first sensor 121 or that of the second sensor 122 into a digital value and outputs it to the CPU 111.

The CPU 111, when the result of detection by the sensor unit 12 is inputted, reads in the identifying information of the detecting device 10 stored in the storage unit 113, and outputs it together with the result of detection to the transmitting unit 13 via the D/A converting circuit 112.

The transmitting unit 13, configured of an oscillator circuit 131, a modulator circuit 132 and a high frequency amplifier circuit 133, modulates a carrier wave generated by the oscillator circuit 131 with the modulator circuit 132 on the basis of signals outputted from the central processor 11, and supplies the modulated signals to the antenna 14 via the high frequency amplifier circuit 133.

The antenna 14 transmits the signals supplied from the transmitting unit 13 (hereinafter referred to as vehicle information) to the relaying device 20 by an electromagnetic wave of a frequency of a long wavelength band or a medium wavelength band. Incidentally, it is irrelevant whether the electromagnetic waves transmitted from the antennas 14 of different detecting devices 10 are of the same frequency or not.

The power source 15 is intended to drive the detecting device 10 by supplying power to the central processor 11, the sensor unit 12 and the transmitting unit 13. Incidentally, though the power source 15 is built in to drive the detecting device 10 according to this embodiment, this is not the only possible configuration, but electromagnetic wave from the relaying device 20 may as well be received by the antenna 14 and high frequency current induced in the antenna 14 is rectified into direct current, which may be stored in a capacitor, secondary battery or the like to serve as the driving power source.

Next, the configuration of the trailer relaying device shown in FIG. 2 will be described with reference to FIG. 4.

In the drawing, the trailer relaying device 20 is configured of the detecting device antennas 21, the relaying device body 22 and the relaying device antenna 23.

Each of the detecting device antennas 21 is matched with the frequency of a long wavelength band or a medium wavelength band to receive the electromagnetic wave transmitted from its detecting device 10.

The relaying device body 22 is configured of a detecting unit 24, a central processor 25, a transmitting unit 26 and a power source 27.

The detecting unit 24 is configured of a diode 241 and an A/D converting circuit 242, the anode of the diode 241 is connected to each of the detecting device antennas 21, and the cathode of the same is connected to the CPU 251 of the central processor 25 via the A/D converting circuit 242. This arrangement causes the electromagnetic wave received by each of the detecting device antennas 21 to be detected by the detecting unit 24 and vehicle information obtained by the detection to be converted into digital signals by the detecting unit 24 to be outputted to the CPU 251.

The central processor 25 is configured of the known CPU 251, a D/A converting circuit 252 and a storage unit 253.

The CPU 251, operating in accordance with a program stored in a semiconductor memory of the storage unit 253, outputs registration data and vehicle data, to be described afterwards, to the transmitting unit 26 via the D/A converting circuit 252.

The storage unit 253 is configured of a ROM in which programs for operating the CPU 251 are stored, an electrically rewritable nonvolatile semiconductor memory, such as an EEPROM, and a volatile semiconductor memory for temporarily storing data or programs, such as an SRAM; identifying information unique to the trailer relaying device 20 is stored into an area, designated to permit no rewriting, of the storage unit 253 in advance at the time of manufacture, and a registration table, and codes representing registration data and vehicle data, to be described afterwards, are stored into an area, designated to permit rewriting, of the storage unit 253 in advance.

The transmitting unit 26, configured of an oscillator circuit 261, a modulator circuit 262 and a high frequency amplifier circuit 263, modulates a carrier wave generated by the oscillator circuit 261 with the modulator circuit 262 on the basis of signals outputted from the central processor 25, and supplies the modulated signals to the relaying device antenna 23 via the high frequency amplifier circuit 263.

The relaying device antenna 23 transmits signals supplied from the transmitting unit 26 to the tractor relaying device 30 by an electromagnetic wave of a frequency of a long wavelength band or a medium wavelength band. Incidentally, it is irrelevant whether the electromagnetic wave transmitted by the relaying device antenna 23 is of the same frequency as that transmitted the detecting devices 10 or not.

The power source 27 is intended to drive the trailer relaying device 20 by supplying power to the detecting unit 24, the central processor 25 and the transmitting unit 26, and driving power is supplied from the vehicle power source 5 via the linking line 50. Incidentally, the trailer relaying device 20 may as well have a secondary battery built into it, which can be charged by the vehicle power source 5 via the linking line 50.

Next, the configuration of the tractor relaying device shown in FIG. 2 will be described with reference to FIG. 5.

In the drawing, the tractor relaying device 30 is configured of the detecting device antennas 31, the relaying device body 32 and the relaying device antenna 33.

Each of the detecting device antennas 31 is matched with the frequency of a long wavelength band or a medium wavelength band to receive the electromagnetic wave transmitted from its detecting device 10.

The relaying device body 32 is configured of a detecting unit 34, a central processor 35 and a power source 36.

The detecting unit 34 is configured of a diode 341 and an A/D converting circuit 342, the anode of the diode 341 is connected to each of the detecting device antennas 31 or the relaying device antenna 33, and the cathode of the same is connected to the CPU 351 of the central processor 35 via the A/D converting circuit 342. This arrangement causes the electromagnetic wave received by each of the detecting device antennas 31 to be detected by the detecting unit 34 and vehicle information obtained by the detection to be converted into digital data by the detecting unit 34 to be outputted to the CPU 351.

The central processor 35 is configured of the known CPU 351 and a storage unit 352.

The CPU 351, operating in accordance with a program stored in a semiconductor memory of the storage unit 352, transmits registration data and vehicle data, to be described afterwards, to the display device 40.

The storage unit 352 is configured of a ROM in which programs for operating the CPU 351 are stored, an electrically rewritable nonvolatile semiconductor memory, such as an EEPROM, and a volatile semiconductor memory for temporarily storing data or programs, such as an SRAM; identifying information unique to the tractor relaying device 30 is stored into an area, designated to permit no rewriting, of the storage unit 352 in advance at the time of manufacture, and a registration table and codes representing registration data and vehicle data, to be described afterwards, are stored into an area, designated to permit rewriting, of the storage unit 352 in advance.

The power source 36 is intended to drive the tractor relaying device 30 by supplying power to the detecting unit 34 and the central processor 35, and driving power is supplied directly from the vehicle power source 5. Incidentally, the tractor relaying device 30 may as well have a secondary battery built into it, which can be charged by the vehicle power source 5.

The relaying device antenna 33 is matched with the frequency of a long wavelength band or a medium wavelength band to receive the electromagnetic wave transmitted from the tractor relaying device 30.

Next, the configuration of the display device shown in FIG. 2 will be described with reference to FIG. 6 and FIG. 7.

In FIG. 6, the display device 40 is configured of a central processor 41, a display unit 42 and a power source 44.

The central processor 41 is configured of the known CPU 411 and a storage unit 412, and the CPU 411 receives registration data and vehicle data transmitted from the tractor relaying device 30 to which it is connected via a cable, read outs data stored in the storage unit 412 and outputs them to the display unit 42. Further, the storage unit 412 is configured of a ROM in which programs for operating the CPU 411 are stored, an electrically rewritable nonvolatile semiconductor memory, such as an EEPROM, and a volatile semiconductor memory for temporarily storing data or programs, such as an SRAM; codes representing registration data and vehicle data, to be described afterwards, are stored into an area, designated to permit rewriting, of the storage unit 412 in advance, wherein registration data and vehicle data transmitted from the tractor relaying device 30 are stored. This enables the display device 40 to display vehicle information even before the detecting device 10 transmits the vehicle information, for instance even immediately after the vehicle monitoring system is actuated.

The display unit 42 displays the result of detection by each detecting device 10 outputted from the CPU 411.

The power source 44 is intended to drive the display device 40 by supplying power to the central processor 41 and the display unit 42, and driving power is supplied directly from the vehicle power source 5. Incidentally, the display device 40 may as well have a secondary battery built into it, which can be charged by the vehicle power source 5.

Further, the display unit 42 is provided with a display panel 43 such as the one shown in FIG. 7. In the left part of this display panel 43, a fitting position display 431, which shows the fitting positions of the detecting devices 10, is displayed while a relaying device display 432, which shows the trailer relaying device 20 or the tractor relaying device 30 to receive the result of detection by each detecting device 10, is displayed farther left of this left part.

In the central part of the display panel 43, three LEDs 433 of red, yellow and green indicating the state of the tire air pressure or the tire temperature detected by the detecting device 10 are arranged. The use of the three LEDs 433 in this way makes it possible to easily recognize visually whichever of three states including abnormal, needing caution and normal.

Incidentally, an audio output device not shown, such as a loudspeaker, may be provided to have the state of the tire air pressure or the temperature within the tire recognized by three different sounds. The use of such an audio output device would make it possible to easily recognize aurally whichever of three states including abnormal, needing caution and normal.

Also, a numerical display 434 is arranged in the upper part of the display panel 43 to numerically indicate the tire air pressure or the tire temperature in each fitting position. This enables the results of detection to be displayed in further detail.

In the right part of the display panel 43, a relay device display switching button 435 and a fitting position display switching button 436 are arranged. Every time the relay device display switching button 435 is pressed, the intermittent lighting position of the relaying device display 432 sequentially changes, and every time the position display switching button 436 is pressed, the intermittent lighting position of the fitting position display 431 sequentially changes. Along with this, the tire air pressure or the tire temperature in the intermittent lighting position, detected and transmitted by the trailer relaying device 20 or the tractor relaying device 30 and a detecting device 10, is indicated on the LEDs 433 and the numerical display 434. This causes the result of detection by any desired detecting device 10 to be displayed.

Next, the operation of the vehicle monitoring system in this embodiment will be described with reference to FIG. 8 through FIG. 14.

As shown in FIG. 8, the operation of the vehicle monitoring system comprises initial processing S100, data creation processing S200 and data transfer processing S300.

When the tractor 2 and the trailer 3 are linked in the combination vehicle 1, the initial processing S100 shown in FIG. 9 is executed by the trailer relaying device 20, the tractor relaying device 30 and the display device 40.

Thus, the CPU 251 of the trailer relaying device 20, upon detecting the coupling of the linking line 50 from a variation in the voltage of the power source 27 (S101), creates registration data to be transmitted to the tractor relaying device 30 (S102).

The registration data created by the CPU 251 in the processing of S102 will be described now.

As shown in FIG. 10, the unit of registration data 60 is 124 bits, consisting of a 64-bit preamble 61, a 4-bit type 62, a 24-bit relaying device ID 63 and a 32-bit CRC 64.

A prescribed bit string for setting the timing of data reception by the tractor relaying device 30 is inputted to the preamble 61.

A code corresponding to the registration data 60 to be stored in the storage unit 253 is inputted to the type 62, which indicates the type of data.

Identifying information on the trailer relaying device 20 to be stored in the storage unit 253 is inputted to the relaying device ID 63.

Error check information for CRC (cyclic redundancy check), which is a known error check method, is inputted to the CRC 64.

The CPU 251, after creating the registration data 60, transmits the registration data 60 to the tractor relaying device 30 via the transmitting unit 26 and the relaying device antenna 23 (S103).

The relaying device antenna 33 of the tractor relaying device 30 receives the registration data 60 transmitted from the trailer relaying device 20 (S104), and the CPU 351 judges whether or not the type 62 contained in the registration data 60 is the same as the code representing the registration data stored in advance in the storage unit 352 (S105).

If the result of judgment reveals that the type 62 is the code representing the registration data, the CPU 351 stores the relaying device ID 63 out of the registration data 60 into the storage unit 352 (S106), and transmits the registration data 60 to the display device 40 (S107).

In the processing of S105, if the type 62 is not the code representing the registration data, no further processing from S106 onward is performed, and the initial processing S100 is ended.

The CPU 411 of the display device 40 receives the registration data 60 transmitted from the tractor relaying device 30 (S108), and judges whether or not the type 62 contained in the registration data 60 is the same as the code representing the registration data stored in advance in the storage unit 412 (S109).

If the result of judgment reveals that the type 62 is the code representing the registration data, the CPU 411 stores the relaying device ID 63 out of the registration data 60 into the storage unit 412 (S110), and ends the initial processing S100. By storing the relaying device ID 63 of the trailer relaying device 20 into the storage unit 412 of the display device 40 in this way when the tractor 2 and the trailer 3 have been linked, the identifying information of the trailer relaying device 20 can be easily stored without having to perform registration work.

If the type 62 is not the code representing the registration data in the processing of S109, the initial processing S100 is ended without performing the processing of S110.

Incidentally, whereas the registration data 60 of the trailer relaying device 20 are stored into the storage unit 412 of the display device 40 when the tractor 2 and the trailer 3 have been linked in this embodiment, in addition to that, when the tractor relaying device 30 has been replaced on account of a trouble for instance, the CPU 351 of the tractor relaying device 30 may also be caused to create registration data similar to the registration data 60 shown in FIG. 10 and transmit the data to the CPU 411 of the display device 40 to have them stored into the storage unit 412. In this way, the identifying information of the trailer relaying device 20 and of the tractor relaying device 30 is stored into the storage unit 412.

The data creation processing S200 shown in FIG. 11 is independently executed by the trailer relaying device 20 and the tractor relaying device 30.

When the detecting device antennas 21 and 31 receive vehicle information transmitted by detecting devices 10 (S201), the CPUs 251 and 351 check whether or not the identifying information contained in the vehicle information exists in any registration table stored in the storage units 253 and 352 (S202).

The registration tables stored in the storage unit 253 of the trailer relaying device 20 and the storage unit 352 of the tractor relaying device 30 will now be described.

FIG. 12 shows an example of registration table 70 which stores, in the form of recording in respect of each fitting position, information on every detecting device 10 received by the trailer relaying device 20 or the tractor relaying device 30.

In the position code 71, the fitting positions of the detecting devices 10 are stored in a coded form. Incidentally, the coding system of the position code 71 enables, if it is unique to the trailer relaying device 20 or the tractor relaying device 30, the fitting position to be identified by identifying the trailer relaying device 20 or the tractor relaying device 30, but it is preferable for the position code 71 to be unique in the combination vehicle 1, such as "A01" being the position code 71 of the tractor relaying device 30 and "A02", the position code 71 of the trailer relaying device 20. This makes possible identification of the fitting position of the detecting device only by the position code 71.

In this embodiment, the position code 71 is made unique for every possible combination vehicle 1 by combining a vehicle type code representing the arrangement and number of tires provided on the pertinent combination vehicle 1 (the vehicle type code in this drawing is "A") and the tire numbers assigned to all the tires 4 provided on the combination vehicle 1 in the sequence of front right, front left, rear right and rear left (the tire numbers in this drawing are 1 through 6). This enables the vehicle type to be identified only by the position code 71.

In the detecting device ID 72, identifying information of the detecting devices 10 fitted to the tires 4 corresponding to the position code 71 is stored.

In the first air pressure 73 and the second air pressure 74, a threshold which is to be referenced in deciding to issue an alarm according to the states of air pressures detected by the first sensors 121 of the detecting devices 10 is stored. In the first temperature 75 and the second temperature 76, a threshold which is to be referenced in deciding to issue an alarm according to the states of temperatures detected by the second sensors 122 of the detecting devices 10 is stored. Incidentally, the air pressure and temperature levels to be registered are not limited to two each, but may as well be one or three or more each.

Although the registration tables 70 are supposed to be stored in the storage units 253 and 352 in advance according to this embodiment, it is preferable for the operator to use a handy type setting device not shown and transmit from outside the combination vehicle 1 the identifying information of the pertinent detecting device 10 (the detecting device ID 72) and thresholds of the sensors pertaining to this detecting device 10 (the first air pressure 73, the second air pressure 74, the first temperature 75, the second temperature 76 and so forth) to have the trailer relaying device 20 or the tractor relaying device 30 receive them and store them into the storage units 253 and 352. This enables the recorded contents of each fitting position in the registration tables 70 to be registered and updated as desired.

Therefore, in the processing of S202, the registration tables 70 are searched for the record of any detecting device ID 72 which is identical with the identifying information contained in the vehicle information.

If the result of processing of S202 reveals the existence of any record of the detecting device IF 72 identical with the identifying information, the CPUs 251 and 351 create vehicle data to be transmitted to the tractor relaying device 30 or the display device 40 (S203).

The vehicle data created by the CPUs 251 and 351 in the processing of S203 will now be described.

In FIG. 13, the unit of the vehicle data 80 is 172 bits, consisting of a 64-bit preamble 81, a 4-bit type information 82, a 24-bit relaying device ID 83, a 48-bit data part 84 and a 32-bit CRC 85.

A prescribed bit string for setting the timing of data reception by the tractor relaying device 30 or the display device 40 is inputted to the preamble 81.

A code corresponding to the vehicle data 60 to be stored in the storage units 253 and 352 is inputted to the type information 82, which indicates the type of data.

Identifying information of the trailer relaying device 20 or the tractor relaying device 30 to be stored in the storage units 253 and 352 is inputted to the relaying device ID 83.

The data part 84 consists of a 24-bit ID code 84a, an 8-bit detected air pressure 84b, a 4-bit air pressure alarm 84c, an 8-bit detected temperature 84d and a 4-bit temperature alarm 84e.

The position code 71 of the record identical with the identifying information contained in the vehicle information received from detecting devices 10 in the registration tables 70 stored in the storage units 253 and 352 is inputted to the ID code 84a. This causes information on the fitting positions of the detecting devices 10 to be provided to vehicle data 80 created by the trailer relaying device 20 and the tractor relaying device 30. Incidentally, the detecting device ID 72 may as well be inputted instead of the position code 71 of the registration tables 70.

The air pressure detected by the first sensor 121 of a detecting device 10 contained in the received vehicle information is inputted to the detected air pressure 84b, and a code indicating the result of judgment by the CPUs 251 and 351, on the basis of the first air pressure 73 and the second air pressure 74 of the identical record, of the air pressure state detected by the first sensor 121 (the code of abnormal, needing caution or normal corresponding to the LEDs 433 of the aforementioned display panel 43) is inputted to the air pressure alarm 84c. For instance, the CPUs 251 and 351 will judge the state to be normal if the air pressure detected by the first sensor 121 is higher than the first air pressure 73, needing caution if it is between the first air pressure 73 and the second air pressure 74 or abnormal if it is lower than the second air pressure 74, and inputs the corresponding code (1: normal, 2: needing caution, 3: abnormal).

The temperature detected by the second sensor 122 of a detecting device 10 contained in the received vehicle information is inputted to the detected temperature 84d, and a code indicating the result of judgment by the CPUs 251 and 351, on the basis of the first temperature 75 and the second temperature 76 of the identical record, of the air temperature state detected by the second sensor 122 (the code of abnormal, needing caution or normal corresponding to the LEDs 433 of the aforementioned display panel 43) is inputted to the temperature alarm 84e. For instance, the CPUs 251 and 351 will judge the state to be normal if the temperature detected by the second sensor 122 is lower than the first temperature 75, needing caution if it is between the first temperature 75 and the second temperature 76 or abnormal if it is higher than the second air pressure 75, and inputs the corresponding code (1: normal, 2: needing caution, 3: abnormal).

By judging the states of the results of detection according to the threshold stored in the registration tables 70 and inputting the states into the air pressure alarm 84c and the temperature alarm 84e in this way, it is made possible to evaluate the result of detection transmitted by each detecting device 10 according to criteria which differ from one detecting device 10 to another.

Error check information of CRC (cyclic redundancy check), which is a known error check method, is inputted to the CRC 85.

Incidentally, though the results of detection and alarm on both the air pressure and the temperature are supposed to be inputted for the vehicle data 80 in this embodiment, this is not the only possibility, but the information on only one of the air pressure and the temperature may be inputted as well. It is also conceivable to alter the unit length of the vehicle data 80 along with this change.

The CPUs 251 and 351 transmits, after creating the vehicle data 80, the created vehicle data 80 to the tractor relaying device 30 or the display device 40 (S204), and ends the data creation processing S200.

In the absence of any record identical with the detecting device ID 72 consistent with the identifying information in the processing S202, the data creation processing S200 is ended without performing the processing of S203 and S204.

Incidentally, the vehicle data 80 are created and transmitted when vehicle information is received from a detecting device 10 in this embodiment, this is not the only possibility, but vehicle data 80 stored in an area in which the results of detection by each detecting device 10 is stored corresponding to the fitting position may as well be transmitted, for instance, when the trailer relaying device 20 has received vehicle information from every detecting device 10 in which a detecting device ID 72 is stored.

Data transfer processing S300 shown in FIG. 14 is executed by the tractor relaying device 30; when the relaying device antenna 33 receives vehicle data 80 transmitted from the trailer relaying device 20 (S301), the CPU 351 determines whether or not the relaying device ID 83 contained in the vehicle data 80 is identical with the relaying device ID 63 stored into the storage unit 352 at the initial processing S100 (S302). Incidentally, it is preferable for the CPU 351 of the tractor relaying device 30 to determine whether or not the type 82 contained in the vehicle data 80 is the code representing vehicle data stored in advance in the storage unit 352 and execute the data transfer processing S300.

If the result of determination reveals that the relaying device ID 83 is identical with the relaying device ID 63, the CPU 351 transmits the vehicle data 80 to the display device 40 (S303) and ends the data transfer processing S300. This causes the vehicle data 80 created by the tractor relaying device 30 and the vehicle data 80 created by the trailer relaying device 20 and stored in the storage unit 352 to be transmitted to the display device 40.

If the relaying device ID 83 is not found identical with the relaying device ID 63 in the processing of S302, the data transfer processing S300 is ended without performing the processing of S303.

The vehicle data 80 transmitted by the tractor relaying device 30 are stored into the storage unit 412 of the display device 40 as a storage table.

The storage table stored in the storage unit 412 will be described now.

FIG. 15 shows an example of storage table 90, which results from storing in a record form part of the vehicle data 80 for each ID code 84a and updating those data with the latest vehicle data 80.

In the drawing, the ID code 84a, the relaying device ID 83, the detected air pressure 84b, the air pressure alarm 84c, the detected temperature 84d and the temperature alarm 84e contained in the vehicle data 80 are stored in an ID code 91, a relaying device ID 92, a detected air pressure 93, an air pressure alarm 94, a detected temperature 95 and a temperature alarm 96, respectively. This enables the CPU 411 of the display device 40 to distinguish the trailer relaying device 20 or the tractor relaying device 30 having created the vehicle data 80 by referencing the relaying device ID 92 in the storage table 90.

When the trailer relaying device 20 or the tractor relaying device 30 is to input to the ID code 84a a position code 71 which is unique for every possible combination vehicle 1, the CPU 411 can distinguish the detecting device 10 having detected the vehicle information by referencing the ID code 91 in the storage table 90, and at the same time distinguish the fitting position of that detecting device 10.

Or when the trailer relaying device 20 or the tractor relaying device 30 is to input to the ID code 84a a position code 71 which is unique for every trailer relaying device 20 or tractor relaying device 30, the CPU 411 can distinguish the detecting device 10 having detected the vehicle information by referencing the ID code 91 and the relaying device ID 92, and at the same time distinguish the fitting position of that detecting device 10.

Therefore, the CPU 411 can turn on and off the relaying device display 432 and the fitting position display 431 on the display panel 43 in accordance with the manipulation of the relay device display switching button 435 and the position display switching button 436, and at the same time read in a record corresponding to the fitting position out of the storage table 90 to have the detected air pressure 93 and the air pressure alarm 94 or the detected temperature 95 and the temperature alarm 96 indicated on the LEDs 433 and the numerical display 434.

Incidentally, when the trailer relaying device 20 or the tractor relaying device 30 is to input to the ID code 84a the relaying device ID 72 in place of the position code 71, the CPU 411 cannot distinguish the fitting position of the detecting device 10, but can distinguish, by referencing the ID code 91 and the relaying device ID 92, the detecting device 10 having detected the pertinent data.

In the vehicle monitoring system in this embodiment as described above, since the trailer relaying device 20 and the tractor relaying device 30 receive vehicle information transmitted from detecting devices 10 having stored identifying information in advance and transmit the vehicle data 80 including their own identifying information, the tractor relaying device 30 stores the identifying information of the trailer relaying device 20 and transmits to the display device 40 the vehicle data 80 and the registration data 60 transmitted by the trailer relaying device 20, the vehicle data 80 of its own creation and its own registration data 60, and the display device 40 stores the identifying information of the tractor relaying device 30 and of the trailer relaying device 20, the display device 40 can distinguish by the relaying device ID 83 contained in the vehicle data 80 the tractor relaying device 30 or the trailer relaying device 20 having transmitted the pertinent vehicle data 80; when for instance the trailer 3 linked to the tractor 2 has been changed, the detecting device 10 can be readily distinguished by the relaying device ID 83 and the ID code 84a contained in the vehicle data 80 transmitted by the tractor relaying device 30 or the trailer relaying device 20 without requiring registration of the identifying information of the detecting devices 10 provided on the new trailer 3 with the display device 40.

Also, as the trailer relaying device 20 and the tractor relaying device 30 input the position code 71 of the detecting device 10 stored in advance to the ID code 84a and transmit the vehicle data 80 to the display device 40, the display device 40 can distinguish by the relaying device ID 83 and the ID code 84a contained in the vehicle data 80 the fitting position of the detecting device 10 having transmitted the vehicle information. This enables the display device 40 to turn on and off the relaying device display 432 and the fitting position display 431 on the display panel 43 and to display the detected air pressure 93 or the detected temperature 95 on the numerical display 434.

Further, as the trailer relaying device 20 and the tractor relaying device 30 judge the state of physical quantities detected by detecting devices 10 on the basis of the first air pressure 73 and the second air pressure 74 or the first temperature 75 and the second temperature 76 stored in advance, and input the result of judgment to the air pressure alarm 84c and the temperature alarm 84e to transmit the vehicle data 80, the display device 40 can judge from the air pressure alarm 84c and the temperature alarm 84e contained in the vehicle data 80 the state of physical quantities detected by the detecting devices 10. This enables the display device 40 to display the air pressure alarm 94 or the temperature alarm 96 on the LEDs 433 on the display panel 43 without registration of the threshold of physical quantities detected by each detecting device 10.

Next, a second embodiment of the present invention will be described.

Figure 16:
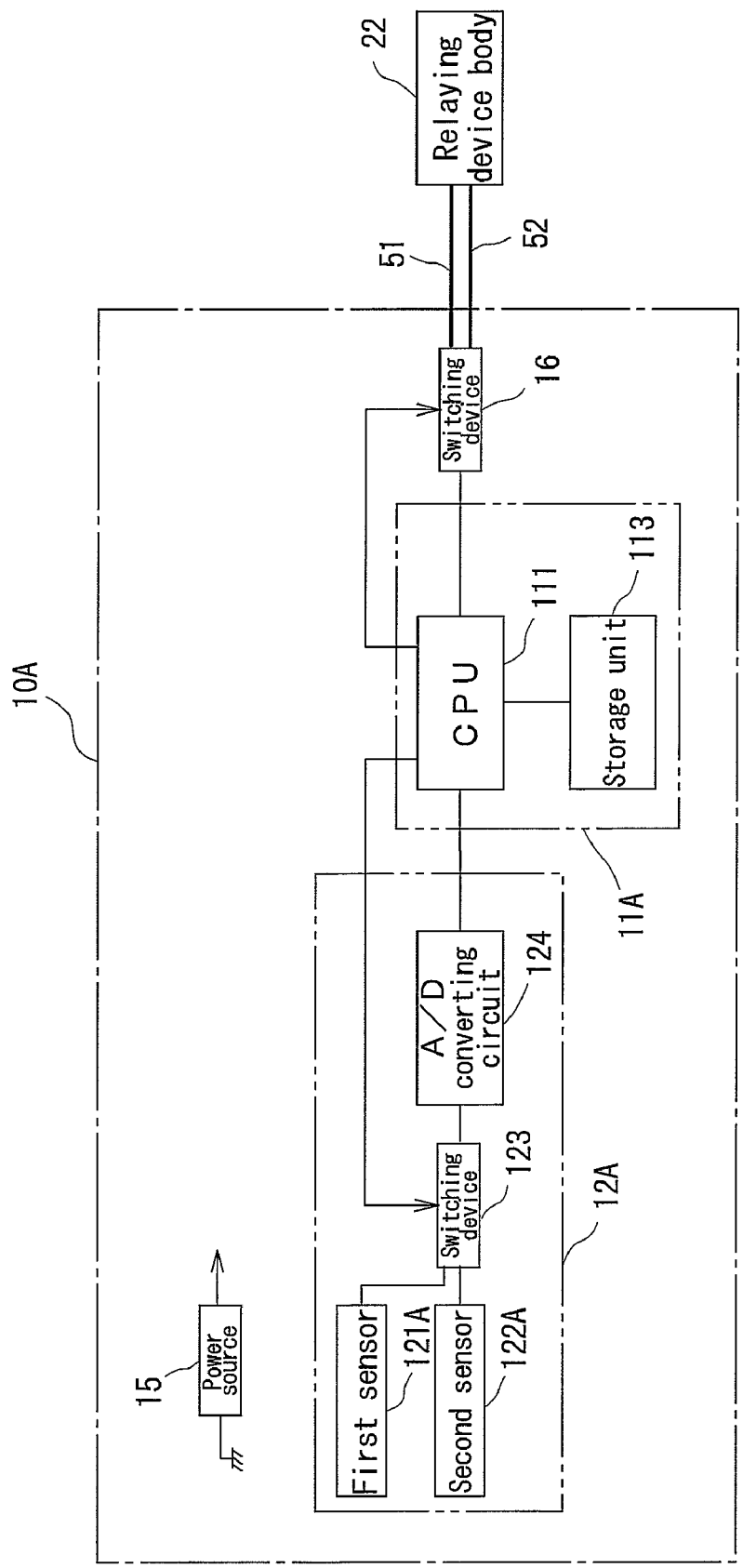
FIG. 16 is a block diagram showing the electric circuit of a detecting device in a second embodiment of the present invention.
Figure 17:
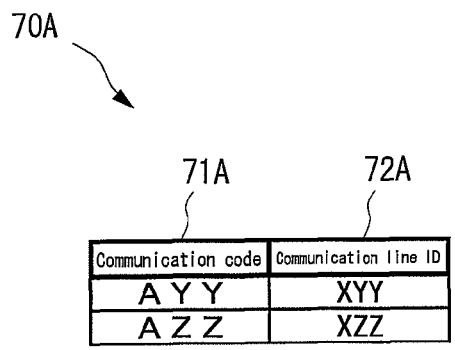
FIG. 17 illustrates a registration table stored in the trailer relaying device.
Figure 18:
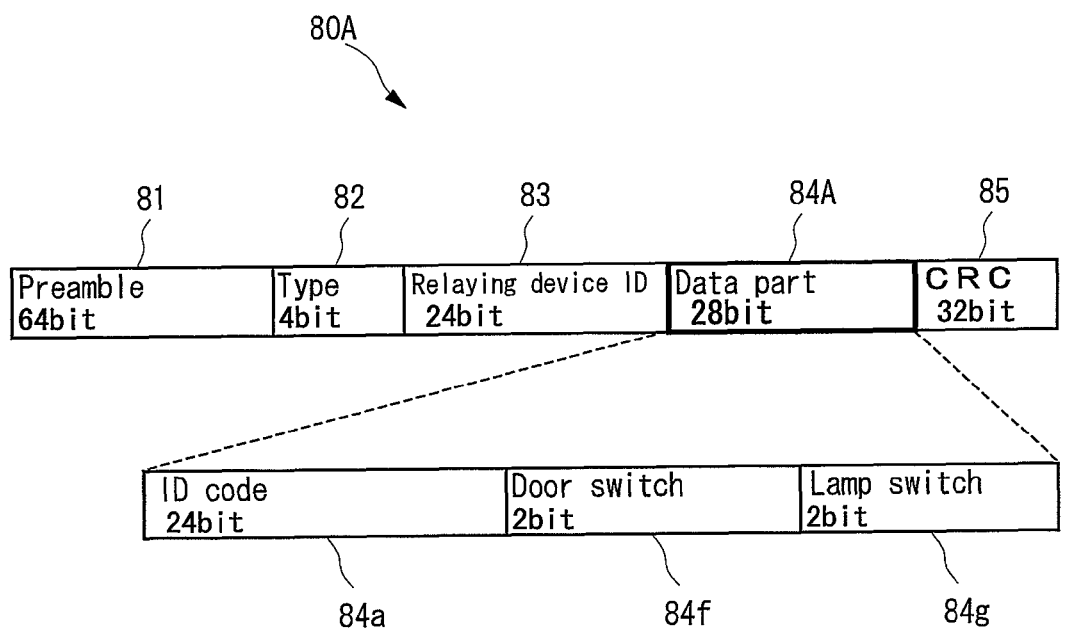
FIG. 18 illustrates vehicle data created by the trailer relaying device.

FIG. 16 through FIG. 18 show the second embodiment of the invention, of which FIG. 16 is a block diagram showing the electric circuit of a detecting device in the second embodiment of the invention; FIG. 17 illustrates a registration table stored in the trailer relaying device; and FIG. 18 illustrates vehicle data created by the trailer relaying device. In these drawings, the same constituent parts as in the first embodiment described above are designated by respectively the same reference symbols, and their description will be dispensed with.

The first embodiment and the second embodiment differ in that detecting devices 10A of which first and second sensors 121A and 122A are connected to the relaying device body 22 by inherent communication lines 51 and 52 and which transmit the results of detection by the first and second sensors 121A and 122A are provided in addition to the detecting devices 10 which transmit vehicle information over the antennas 14.

Referring to FIG. 16, since the detecting devices 10A transmit the results of detection (hereinafter referred to as vehicle information) via the communication lines 51 and 52, the D/A converting circuits of the antennas, the transmitting unit and the central processor 11 become unnecessary, and in this connection a switching device 16 for switching over the connection of the sensor unit 12 and the output of a central processor 11A to the communication lines 51 and 52 under the control of the central processor 11A is provided.

As the first sensor 121A and the second sensor 122A, sensors which detect the on/off states of switches provided on the combination vehicle 1, convert the states into electric signals and output them are used, such as open/closed state sensors for the door and live/dead state sensors for lamps.

In this embodiment, a door open/closed state sensor for detecting the open/closed state of the cargo chamber door of the trailer 3 is configured as the first sensor 121A, and a lamp live/dead sensor for detecting the live/dead state of lamps of the trailer 3 is configured as the second sensor 122A. Incidentally, as in the first embodiment, the number of sensors is not limited, and a sensor for detecting the on/off states of switches and a sensor for detecting physical quantities can be used in combination.

A registration table 70A shown in FIG. 17 is stored in the storage unit 253 in the trailer relaying device 20 in addition to the registration table 70 shown in FIG. 12.

The communication lines 51 and 52 to be connected to the detecting devices 10A are stored in a communication code 71A in a coded form. Incidentally, the coding system for the communication code 71A should preferably be unified with the coding system for the position code 71 described above. In this embodiment, the position code 71 and the communication code 71A are made unique for every combination vehicle 1 by combining the vehicle type code (the vehicle type code in the drawing is "A") with the communication line numbers (the communication line numbers in the drawing are "YY" and "ZZ" and do not duplicate the aforementioned tire numbers) allocated for all the communication lines 51 and 52 in that combination vehicle 1.

Identifying information of the communication lines 51 and 52 is stored in a communication line ID 72A, and the port address or the like of the CPU 251 of the trailer relaying device 20 is usually used as this information. Therefore, the communication lines 51 and 52 need not be two physical cables, but instead may be communication routes which the CPU 251 can logically distinguish. Also, the communication routes need not be wired means, such as cables, but may be wireless means.

Further, as shown in FIG. 18, the unit of vehicle data 80A is 152 bits, which consist of a 28-bit data part 84A in addition to a preamble 81, type information 82, a relaying device ID 83 and a CRC 85; the data part 84A consists of a 2-bit door switch 84f and a 2-bit lamp switch 84g in addition to the ID code 84a.

When the CPU 251 creates the vehicle data 80A on the basis of vehicle information received from the communication lines 51 and 52, the communication code 71A of the record identical with the identifying information of the communication lines 51 and 52 is inputted to the ID code 84a, a code matching the opening/closing of the door detected by the first sensor 121A of the detecting device 10A contained in the received vehicle information is inputted to the door switch 84f, and a code matching the on/off state of the lamp detected by the second sensor 122A of the detecting device 10A contained in the received vehicle information is inputted to the lamp switch 84g.

In the vehicle monitoring system in this embodiment as described above, by having detecting devices 10A transmit vehicle information over the communication lines 51 and 52 intrinsic to the first sensor 121 or the second sensor 122, a similar effect to that of the first embodiment can be achieved even if the vehicle information does not contain the identifying information of the detecting device 10A.

Incidentally, a system may as well be configured by combining or partly replacing the configurations or the actions of the embodiments described above.

Further, the embodiments described above are mere specific examples, and the configurations and the actions of the present invention are not limited to these, but can be modified in various ways without deviating from the essentials of the invention.

INDUSTRIAL APPLICABILITY

Since the display device can identify from identifying information of a relaying device contained in vehicle information the relaying device having transmitted that vehicle information, when for instance the trailer linked to the tractor has been changed, the detecting device can be readily distinguished by identifying information of the relaying device and the detecting device contained in the vehicle information transmitted by each detecting device without requiring registration of the identifying information of each detecting device provided on the new trailer with the display device, and accordingly the system can be applied to combination vehicles in which the vehicle states in terms of tire air pressure, temperature and so forth are monitored.

The invention claimed is:

1. A vehicle monitoring system comprising:
a plurality of detecting devices each of which detects a state of a prescribed position of a vehicle and transmits the result of detection;
a plurality of relaying devices each of which receives the result of detection transmitted from the plurality of detecting devices and transmits the result of detection; and
a display device which displays the results of detection transmitted by the plurality of relaying devices, wherein:
a prescribed detecting device has means of transmitting vehicle information including at least the result of detection and self-identifying information;
each of the relaying devices has:
vehicle information determining means which decides, on the basis of identifying information of at least one detecting device stored in advance, whether or not to receive vehicle information transmitted by the detecting device,
vehicle information transmitting means which transmits, when the vehicle information determining means has decided to receive vehicle information, that vehicle information with the self-identifying information included therein, and
registration information transmitting means which transmits registration information including self-identifying information and type information indicating the registration of that self-identifying information;
one relaying device out of the plurality of relaying devices transmits vehicle information and registration information to the display device, and the other relaying device transmits vehicle information and registration information to the one relaying device;
the one relaying device has:
registration information determining means which decides, on the basis of type information stored in advance, whether or not to receive registration information transmitted by the other relaying device,
registration information transfer means which, when the registration information determining means has decided to receive the registration information, stores identifying information contained in the registration information and transmits the registration information to the display device,
vehicle information determining means which, on the basis of the identifying information of the stored registration information, decides whether or not to receive vehicle information transmitted by the other relaying device, and
vehicle information transfer means which, when the vehicle information determining means has decided to receive the vehicle information, transmits the received vehicle information to the display device; and
the display device has:

receiving means which receives vehicle information and registration information transmitted by the one relaying device, and storage means which, on the basis of type information stored in advance, stores identifying information contained in the registration information.

2. The vehicle monitoring system according to claim 1, wherein:

the display device has means of displaying, on the basis of identifying information stored by the storage means, which relaying device out of the plurality of relaying devices has transmitted the vehicle information.

3. The vehicle monitoring system according to claim 1, wherein:

the other relaying device is provided with an antenna for transmitting vehicle information and registration information;

the one relaying device is provided with an antenna for receiving vehicle information and registration information; and the antenna of the one relaying device and the antenna of the other relaying device are disposed in respective positions where transmission and reception are possible.

4. The vehicle monitoring system according to claim 1, wherein:

the detecting devices are fitted in one or another of a plurality of prescribed positions prescribed for each vehicle type; and the vehicle information transmitting means has means of assigning, on the basis of the identifying information and fitting position of at least one detecting device stored in advance, positional information to vehicle information and transmitting the same.

5. The vehicle monitoring system according to claim 4, wherein:

the display device has means of displaying, on the basis of the positional information included in vehicle information, which fitting position out of the plurality of fitting positions that vehicle information has been transmitted from.

6. The vehicle monitoring system according to claim 1, wherein:

said prescribed detecting device has at least one sensor which detects a prescribed physical quantity and means of having the value of the physical quantity detected by the sensor included in said result of detection; and the vehicle information transmitting means has means of assigning, on the basis of the result of detection of vehicle information and at least one threshold in at least one of said sensors stored in advance, alarm information to vehicle information and transmitting the same.

7. The vehicle monitoring system according to claim 6, wherein:

each of its number is not limited to this, but relaying devices has means of receiving and storing the identifying information of a detecting device transmitted from an external setting device and the thresholds of sensors of the detecting device.

8. The vehicle monitoring system according to claim 6, wherein:

the display device has means of displaying in color, on the basis of alarm information contained in vehicle information, a state of the prescribed physical quantity detected by the sensor.

9. The vehicle monitoring system according to claim 6, wherein:

the display device has means of outputting in sound, on the basis of alarm information contained in vehicle information, a state of the prescribed physical quantity detected by the sensor.

10. The vehicle monitoring system according to claim 6, wherein:

said result of detection includes as said value of the physical quantity at least one out of the air pressure, temperature, humidity, distance and acceleration.

11. The vehicle monitoring system according to claim 1, wherein:

the vehicle comprises a tractor and at least one trailer, and every one of the trailer(s) is equipped with at least one unit of the other relaying device, and the tractor is equipped with the one relaying device and the display device.

12. The vehicle monitoring system according to claim 11, wherein:

the registration information transmitting means of the other relaying device has means of transmitting registration information when the tractor and the trailer(s) have been linked together.

13. The vehicle monitoring system according to claim 1, wherein:

said prescribed detecting device is equipped with an antenna for transmitting vehicle information;

each of the relaying devices is equipped with at least one antenna for receiving vehicle information; and the antenna(s) is (are) disposed in the vicinity of the antenna of the prescribed detecting device in which identifying information is stored in advance.

14. The vehicle monitoring system according to claim 1, wherein:

said prescribed detecting device is fitted to every tire provided on said vehicle.

15. The vehicle monitoring system according to claim 1, wherein:

the display device has means of storing at least the results of detection, the identifying information of the relaying devices and the identifying information of the detecting device out of the vehicle information transmitted by the one relaying device.

16. The vehicle monitoring system according to claim 1, wherein:

the prescribed detecting device has means of transmitting vehicle information including at least the results of detection over intrinsic communication routes;

each of the relaying devices has means of receiving from the communication routes the vehicle information transmitted by the prescribed detecting device and the vehicle information transmitting means has means of assigning, on the basis of the identifying information of at least one detecting device stored in advance and the identifying information of the communication routes, communication route information to the vehicle information and transmitting the same.

17. The vehicle monitoring system according to claim 16, wherein:

the prescribed detecting device is equipped with at least one of sensors for detecting the on/off state of a prescribed switch provided on the vehicle.

* * * * *